United States Patent [19]

Smrt et al.

[11] Patent Number: 5,196,459
[45] Date of Patent: Mar. 23, 1993

[54] WATER-BASED AEROSOL COATING COMPOSITIONS

[75] Inventors: Thomas J. Smrt, Marengo; Walter S. Mierzwinski, Schaumburg, both of Ill.

[73] Assignee: Fox Valley Systems, Inc., Cary, Ill.

[21] Appl. No.: 601,439

[22] Filed: Oct. 22, 1990

[51] Int. Cl.$^5$ .................. C08L 67/03; C08L 93/04
[52] U.S. Cl. .................. 523/502; 523/501; 524/272
[58] Field of Search .................. 523/501, 502; 524/272

[56] References Cited

U.S. PATENT DOCUMENTS 2,220,685  11/1940  Myers .................................... 523/502
4,420,575  12/1983  Rapaport et al. ...................... 523/502

FOREIGN PATENT DOCUMENTS 0258618  7/1988  Fed. Rep. of Germany ...... 524/272

Primary Examiner—Paul R. Michl
Assistant Examiner—Peter Szekely
Attorney, Agent, or Firm—Leydig, Voit & Mayer

[57] ABSTRACT

A water-based aerosol coating composition suitable for discharge from an aerosol container comprising: a monomer-modified alkyd resin which is rendered water-soluble by neutralization with a base, a rosin-modified maleic resin which is rendered water-soluble by neutralization with a base, a water-soluble organic solvent, water, and a propellant, preferably dimethyl ether. The composition provides a durable coating or film when applied onto a substrate. Further, the composition is non-flammable upon discharge.

26 Claims, No Drawings

WATER-BASED AEROSOL COATING COMPOSITIONS

FIELD OF THE INVENTION

The present invention relates to aqueous-based aerosol coating compositions and, more specifically, aerosol paint compositions.

BACKGROUND OF THE INVENTION

Prior to the discovery of the present invention, there have been innumerable aerosol compositions proposed for providing a continuous coating or film for decorative or protective purposes. Aerosol coating compositions using conventional solvent reduced pigmented organic polymeric binders have heretofore found wide acceptance because of their ready availability to apply paint coatings without concomitant clean up problems associated with brushing applications and brush-marks foreign to spray coating applications. Until recently, aerosol paints were substantially and conventionally water-free, solvent thinned products formulated with propellants of the hydrocarbon class.

With the rapid development of water-reducible paint systems characterized by ease of application, ready clean up, and freedom from fire hazard, water-containing systems for aerosol paints are of major interest. Water-containing aerosol spray paints have the advantage of low toxicity levels, non-flammable spray paint systems, and in some cases ready clean up with soap and water after completion of the paint application.

Early formulations of these aerosol water-reducible coating compositions did not, however, contain water as a major component. For example, U.S. Pat. No. 4,187,204, takes advantage of resinous synthetic polymers or paint binders; illustratively, maleinized oils, oil modified alkyds, copolymer oils, epoxy resins, etc., having sufficient carboxyl groups (acid value) to be solubilized in water by neutralization of the acid groups present. The resulting product may contain some water, but not more than 10%. Acid values of the resins were neutralized with ammonia and amines, and dissolved in water-soluble solvents. This reference includes as propellants the lower molecular weight hydrocarbons fluorocarbons, etc., $CO_2$, nitrous oxide, cyclo-propane, etc. Among the host of non-distinguishable propellants dimethyl ether was named as useful. The useful water content was limited however to preferably less than 8%.

U.S. Pat. No. 4,125,499 uses organic co-solvents including acetone, ethers, ethylene glycol n-butyl ether, etc., with about 5% of water with some water-soluble alkyd resins (Aquamac 1200, Kelsol 3902, etc). Aliphatic hydrocarbons and halofluorocarbons and methyl ethers including dimethyl ether are used in propellant admixtures. Again water is limited to not more than 10%.

Subsequent development of these aqueous-based aerosol coating compositions have yielded increased water content aerosols. For example, U.S. Pat. No. 4,518,734 provides water-based aerosol coatings which comprise water-reducible resins, water in an amount from 10 to 70 wt. percent, a water-soluble solvent and dimethyl ether as a propellant. The resins contemplated by this reference include water-soluble oil-modified alkyds, acrylics, styrene acrylics, urethanes, polyesters, silicone polymers and epoxies in an amount ranging from 5 to 60 wt. percent.

U.S. Pat. No. 4,450,253 discloses a composition of 6 to 25 wt. percent of a water-soluble oil-modified ester polymer, 10 to 40 wt. percent water, 0.1 to 15 wt. percent of a water-soluble polar organic solvent, and 20 to 60 wt. percent of dimethyl ether as a propellant. No other types of resins are contemplated by this reference.

U.S. Pat. No. 4,482,662 provides yet another water-based aerosol composition. This composition includes 5 to 20 wt. percent of a water-soluble monomer modified alkyd resin having an acid value from 30 to 80, 15 to 40 wt. percent water, 5 to 30 wt. percent of a water-soluble organic solvent, and 20 to 45 wt. percent of dimethyl ether. U.S. Pat. No. 4,420,575, which is related to the '662 patent, contemplates an emulsion polymer latex as the film-forming component as well as the water-soluble alkyd resin.

Although the water-reducible resins contemplated in these references are suitable for film-forming, they produce a relatively soft film. Such films are easily damaged when an article onto which the film is applied is used. Further, maintaining the cleanliness of a soft film is more difficult. Various types of foreign materials, e.g., dust and dirt, are more easily embedded into a softer film.

There is an additional limitation on the use of the aforesaid resins. More specifically, there is an upper limit on the weight percent of these resins and other solids in aerosol formulations due to their effect on the viscosity of the aerosol composition. As the amount of resin and other solids is increased, the viscosity increases. As the viscosity of an aerosol composition should be less than about 400 centipoises for acceptable spraying characteristics, and preferably from about 100–200 centipoises, the wt. percent solids of known compositions are typically limited to an amount less than about 30 wt. percent.

Thus, there exists a need for an water-based aerosol coating composition which, after discharge onto a substrate, results in a film which is more easily kept free of embedding contaminants, is more durable than previously existing compositions, and, further, which exhibits favorable characteristics in the area of flammability.

SUMMARY OF THE INVENTION

While the present invention will be described in connection with certain preferred embodiments, it is not intended to be so limited. On the contrary, it is intended to cover all alternatives, modifications, and equivalent arrangements as may be included within the spirit and scope of the invention as defined by the appended claims.

In accordance with the foregoing objectives, the present invention provides a water-based aerosol coating composition suitable for discharge from an aerosol container comprising a monomer-modified alkyd resin which is rendered water-soluble by neutralization with a base, a rosin-modified maleic resin which is rendered water-soluble by neutralization with a base, a water-soluble organic solvent, water, and a propellant.

DETAILED DESCRIPTION OF THE PREFERRED EMBODIMENTS

Generally, alkyd resins, which provide the basis for the resins of the present invention, are formed by combining polybasic acids or their anhydrides, usually phthalic anhydride, with a polyhydric alcohol, such as, glycerol. Modifications of the alkyd resin by other monomers, such as acrylic acid, may be effected by substituting acrylic acid for a portion of the polybasic acid.

The monomer modified alkyd resins contemplated by the present invention are not critical and include those alkyd resins modified during polymerization with monomers including, e.g., drying oils, styrene, methyl acrylate, ethyl acrylate, methyl methacrylate, ethyl methacrylate, and urethane modified alkyds. Monomer modified alkyds useful for the purposes herein are commercially available from a number of sources as are well known to the coatings art.

Representative examples of commercially-available modified alkyd resins which may be used in the present invention are those acrylated oil-modified alkyd resins sold under the trademarks or tradenames "B-1537-M" by Cook Paints and Varnishes, "7419" by Cargill Chemical Products, "WR-4005-BC-70" by Reliance, and "Aquamac 1100" by McWhorter Resins, the styrenated oil-modified alkyd resins sold under the trademark or tradename "7423" by Cargill Chemical Products, the silicone-modified oil-modified alkyd resin sold under the trademark or tradename "Kelsol 3970-94-75" by Spencer Kellogg division of Textron Inc. and the urethane-modified oil-modified alkyd resins sold under the trademarks or tradenames "Spensol F72" by Spencer Kellogg division of Textron Inc. and "Aquamac 1200" by McWhorter Resins.

The present composition further comprises rosin-modified maleic resins which are produced from rosin esters. Rosin esters useful as modifying resins are well known in the art. Many are commercially available and are generally made from gum rosin, wood rosin, tall oil rosin or a combination thereof. Such rosins contain a variety of acids such as pimaric, levopimaric, palustric, isopimaric, dehydroabietic, abietic and neoabietic. The concentration of the various acids varies from one type of rosin to another. As stated previously, rosin-modified maleic resins are contemplated by the present invention. While the acid value of the these resins may range between about 6 and about 255, acid values over 100 are preferred because they are more compatible with the alkyd resins, e.g., they allow for the production of a quality, continuous film while maintaining the sprayability of the aerosol composition.

Rosin esters are described in the literature. Examples may be found in "Rosin Based Alkali Soluble Resins" from "American Ink Maker", September, 1976 and U.S. Pat. No. 2,590,910. In general there are two different ways to react the basic ingredients of the rosin ester as described in the aforementioned article "Rosin Based Alkali Soluble Resins."

In the first method, the rosin is first reacted with an acid or anhydride, such as maleic anhydride or maleic acid, and then this adduct is reacted further by esterification. This reaction sequence gives products which are quite uniform and gives the most complete reaction of rosin and acid or anhydride. The disadvantages are that this is time consuming and causes difficulty when using low boiling polyols.

The second method is the simultaneous reaction between the rosin and unsaturated acid or anhydride as well as the esterification of the acid or anhydride. This method is easier to accomplish from a production standpoint and allows a broad variety of raw materials to be used. The resins reacted by the second method, however, generally have more rosin unreacted with acid or anhydride and are not as uniform as those produced by the first method.

The procedure for simple esterification may follow any of those ordinarily employed for rosin acid esterification. The rosin is generally melted and the polyhydroxy material may be added all at once or gradually over several hours. Stirring and an inert atmosphere are advisable, and temperatures as high as 300° C. may be employed for periods of time ranging from two to eighteen hours. However, a period of time varying from six to eight hours is usually sufficient to obtain a low acid number. The water of reaction may be removed azeotropically or by bubbling an inert gas through the reaction mixture. The application of a vacuum, especially at the end of the reaction, is likewise advisable. In addition, catalysts such as metallic stearates, acidic catalysts such as zinc chloride, mineral acids, or p-toluene sulfonic acids, and the like, facilitate the reaction.

Polyols which may be used in the esterification include those having from 1 to about 8 carbon atoms, such as ethylene glycol, propylene glycol, diethylene glycol, triethylene glycol, neopentyl glycol, 1,3-butanediol, 1,4-butanediol, glycerine, trimethylolethane, trimethylolpropane and pentaerythritol.

Examples of commercially available maleated rosin ester resins include Unirez 7019, 7705, 7057 and 7098 available from Union Camp Corporation (Jacksonville, Fla.), Pentalyn 255, 261, 269 and 856 available from Hercules, Inc. (Wilmington, Del.) and Resinall 801, 802, 805, 807, 807A, 810 and 833 available from Resinall Corp. (Stamford, Conn.).

The maleated resins of the present invention are present as a means by which the resulting film or coating can be afforded a greater degree of hardness and durability. As such, the amount of this resin in the composition is not critical so long as the composition discharges properly and provides a continuous film. Typically, the resin will be present in an amount ranging from about 5 to about 25 wt. percent.

A further advantage associated with the use of these maleated resins is the ability to produce an aerosol composition having a higher solids content than compositions produced using conventional water-soluble alkyd resins alone without adversely affecting the viscosity of the composition. Typically, the solids content of conventional aerosol compositions is limited below about 30 wt. percent. Any amount of solids above this limit generally increases the viscosity of these compositions to unacceptable levels. Viscosities over about 400 centipoises are considered unacceptable, with viscosities ranging from about 100-200 centipoises being preferred. With the use of this maleated resin in combination with water-soluble alkyd resins, however, the solids content can be increased to over about 30 wt. percent up to about 40 wt. percent without adversely affecting the viscosity of the composition, i.e., the viscosity remains below about 400 centipoises and advantageously between about 100-200 centipoises.

Additional advantages relating to viscosity can be obtained when the wt. percent of the water-soluble alkyd resins is limited. As the alkyd resin component is primarily responsible for the increase in viscosity as opposed to the maleic resin component, the present invention allows the alkyd resin component to be limited to less than 5 wt. percent, preferably less than 4 wt. percent, without the composition experiencing a corresponding loss in film-forming properties. The lower limit is about 1 wt. percent because this is the minimum amount required to maintain sufficient flexibility of the film or coating.

The resins of the present invention are made water-soluble by neutralization of their acid values to a pH of over 7 to about 10 with low molecular weight amines, e.g., ammonia, lithium bases or mixtures of these neutralizing agents. The lithium compounds contemplated include, e.g., lithium hydroxide and lithium carbonate. Typically, these components are present in amounts up to about 2 wt. percent.

The propellants contemplated by the present invention include any type of propellant or mixture of propellants that will aerosolize the film-forming composition. Typically, liquid propellants are used to provide such aerosolization. By use of the term "liquid propellant," it is contemplated that such propellant is gaseous at room temperature but liquid under pressures found within an aerosol container.

The propellant selected should also be inert, i.e., it should not react with the components of the composition. Propellants suitable for use in the present composition include non-halogenated hydrocarbons, e.g., methane, ethane, propane, butane, isobutane, as well as dimethyl ether. The halogenated hydrocarbons, e.g., Freon 12, may also be used. Mixtures of these propellants are also acceptably included into the present composition. However, use of such halogenated hydrocarbons is presently on the decline due to environmental concerns over their effect on the ozone layer surrounding the earth. As such, use of these propellants is not preferred.

The preferred propellant is dimethyl ether due to its water solubility. Dimethyl ether has recently become commercially available as a propellant in aerosol systems, e.g., Dymel® A (E. I. du Pont de Nemours & Co.) and is the preferred propellant due to its water solubility. It has since been investigatively employed in development work of the aerosol paints of this invention. It has been found useful, not only as a major proportion of the propellant phase essential to efficient atomization of the aerosol paint for application purposes, but also because it provides excellent co-solvency in conjunction with the specific blends of other water-soluble organic solvents, individuals of which have been an active part of paint technology for a long time, including, e.g., lower molecular weight alcohols and ketones, the alkylene glycol mono-butyl ethers and esters.

The quantity of propellant utilized will vary based upon the specific aerosol composition formulated. The proportions of the ingredients in the aerosol should be taken into account as well as the flammability of the resulting composition. Generally, the amount of such components, including the propellant, is limited such that the composition is non-flammable upon discharge from the aerosol container. Thus, the amount of propellant present should be, as a general rule, that which is sufficient to expel substantially all of the components from the containment means without rendering the composition flammable. The sufficiency of propellant in an aerosol is typically determined by reference to the vapor pressure inside the aerosol container. Generally, when the vapor pressure reaches a range of about 30 to 85 psig at 70° F., a sufficient amount propellant has been introduced. Preferably, the pressure ranges from about 40 to 80 psig.

In order to reach the aforesaid pressures, the propellant is typically present in an amount ranging from about 20 to 50 wt. percent, and preferably from about 30 to 40 wt. percent, of the composition. The use of dimethyl ether requires that a greater wt. percent of this component be included in the composition than if other non-halogenated hydrocarbons or halogenated hydrocarbons are used. This is due to the dimethyl ethers characteristic lowering of the vapor pressure upon exposure to the organic solvents.

The water component of the present composition is generally present in an amount sufficient to allow adequate dispersion of the solids as well as assist in rendering the composition non-flammable. This amount typically ranges from about 10 to 60 wt. percent, and preferably from above 10 to below 20 wt. percent of the composition.

Water-soluble organic solvents are also present in the composition. This component assists in the evaporation of liquids after the composition has been discharged from the container. However, the addition of solvents to the composition also serves to increase its flammability. Therefore, the amount of solvent employed, when combined with the additional components, should be limited such that the composition is non-flammable upon discharge from the container. Preferred solvents include the alcohols, e.g., methanol, ethanol, propanol, e.g., isopropanol, butanol, and mixtures thereof. These solvents are typically present in an amount ranging from about 1 to 30 wt. percent and, preferably from about 1 to less than 15 wt. percent.

As mentioned previously, the compositions of the present invention are advantageously non-flammable. The test for flammability used is the "Flame Projection Test." This test was originally developed by the American Association of Railroads, Explosives Division, the United States Department of Agriculture, and the Aerosol Division of the CSMA. This test, which is well known in the art, may be found in the CSMA "Aerosol Guide" (7th ed. April, 1981) at page 14 as well as in "The Aerosol Handbook" (2d ed.) by M. A. Johnson at pages 211–212, these publications being incorporated herein in their entirety. Generally, the test contemplates that an aerosol dispenser which is filled with the composition to be tested be shaken and then positioned upright, unless the label states otherwise. The dispenser is subsequently placed six inches from a flame source in a draft-free area. The actual test is run for four seconds, i.e., the dispenser is discharged in the direction of the flame for four seconds. During discharge, the composition should be sprayed through the top one-third of the flame.

In assessing the results, page 18 of the aforesaid CSMA Aerosol Guide deems a composition "Flammable" when the aerosol, during the "Flame Projection Test," produces a flame exceeding eighteen inches in length or produces a "Flashback" which touches the actuator of the dispenser. A flame length less than eighteen inches in length, in combination with the absence of "Flashback," indicates the composition is non-flammable. A composition is considered to be "Extremely Flammable" by the CSMA when the "Flashback" touching the actuator is produced during the aforementioned test and which has a flash point of less than 20° F according to the "Tag Open-Cup Flash Point Test" of the CSMA.

When desired, a pigment may be included in the composition such that a color is imparted to the resulting film. As such, an amount of pigment which is appropriate to obtain the desired degree of pigmentation is included in the composition. The pigment may comprise any convenient pigment, e.g., titanium dioxide, calcium carbonate, magnesium silicate, and mixtures thereof. The amount of pigment typically ranges up to about 15 wt. percent.

The inclusion of a pigment and other solid components in the composition will usually, but not always, require the presence of a dispersant. This component serves to maintain these solids dispersed substantially uniformly throughout the composition. Although any dispersant or mixture of dispersants which acts to adequately disperse the pigments and other solids, Nalco 2395 (Nalco Chemical), an ethoxylated castrol oil, is preferred. The amount of dispersant will advantageously range up to about 2 wt. percent of the composition.

In addition, a clay may also be included in the composition to increase the solids content of the composition which assists in the production of a higher density film or coating. This component is preferably present in an amount up to about 15 wt. percent.

Other optional components, such as aerosol container corrosion inhibitors, e.g., sodium nitrite, and "flash" corrosion inhibitors, may also be advantageously combined with the other components described herein into the present composition.

EXAMPLES Example 1

This example exemplifies a yellow water-based aerosol paint composition of the present invention.

| Component | Wt. percent |
|---|---|
| Aquamac 1100 | 3.8 |
| Unirez 7055 | 8.7 |
| Isopropyl alcohol | 11.8 |
| n-Butyl alcohol | 2.5 |
| Medium chrome yellow | 12.6 |
| Titanium dioxide | 3.1 |
| Molybdate orange | 0.2 |
| Clay | 3.1 |
| Water | 18.1 |
| Ammonia | 0.5 |
| Nalco 2395 | 0.5 |
| Sodium nitrite | 0.1 |
| Dimethyl ether | 35.0 |
| Total | 100.0 |

This composition was produced according to the following procedure. The Aquamac 1100 was neutralized with an appropriate amount of ammonia as determined by a formula which is well known in the art: Wt. ammonia necessary to neutralize a resin=((acid value of resin)×(wt. resin)×(equivalent wt. of ammonia))/56,100. After completion of neutralization, the Nalco 2395 dispersant was added to the Aquamac 1100 resin with enough water to obtain proper dispersion of the resin as well obtain the proper viscosity of the composition. Pigments were then added and mixed so as to disperse the pigments throughout the composition. In a separate container, the maleic resin, Unirez 7055, was dissolved in an equal amount (wt. %) of isopropanol. The Unirez was then neutralized with the appropriate amount of ammonia, the appropriate amount of ammonia being determined by use of the above formula. This Unirez-based composition was then added to the Aquamac-based composition. The balance of the components were subsequently added to form the final composition.

After the components were thoroughly mixed, the composition was charged into an aerosol container and subjected to the "Flame Projection Test." The composition was found to be non-flammable. Further, the composition had a total solids content of 31.5, yet the composition discharged properly from the dispenser, without difficulty.

Example 2

This example exemplifies a white water-based aerosol paint composition of the present invention.

| Component | Wt. percent |
|---|---|
| Aquamac 1100 | 3.9 |
| Unirez 7055 | 9.0 |
| Isopropyl alcohol | 12.9 |
| n-Butyl alcohol | 2.7 |
| Titanium dioxide | 9.9 |
| Clay | 6.6 |
| Water | 18.0 |
| Ammonia | 0.6 |
| Nalco 2395 | 0.5 |
| Sodium nitrite | 0.1 |
| Dimethyl ether | 35.0 |
| Total | 100.0 |

This composition was produced according to the procedure used in Example 1.

After mixing, the composition was charged into an aerosol container and subjected to the "Flame Projection Test." This composition was found to be non-flammable.

What we claim is:

1. A water-based aerosol coating composition suitable for discharge from an aerosol container comprising:
   a monomer-modified alkyd resin which is rendered water-soluble by neutralization with a base,
   a rosin-modified maleic resin which is rendered water soluble by neutralization with a base,
   a water-soluble organic solvent,
   water, and
   a liquid propellant,
wherein the weight percent of the maleic resin in the composition is greater than the weight percent of alkyd resin in the composition.

2. The aerosol composition according to claim 1, wherein the monomer-modified alkyd resin is an oil-modified alkyd resin.

3. The aerosol composition according to claim 2, wherein the monomer-modified alkyd resin is present in the composition in an amount ranging from 1 to less than 5 wt. percent.

4. The aerosol composition according to claim 3, wherein the rosin-modified maleic resin is present in the composition in an amount ranging from at least 5 to about 25 weight percent.

5. The aerosol composition according to claim 1, wherein the water is present in the composition in an amount ranging from about 10 to about 50 wt. percent.

6. The aerosol composition according to claim 1, wherein the propellant is present in the composition in an amount ranging from about 20 to about 50 wt. percent.

7. The aerosol composition according to claim 1, wherein the organic solvent is present in the composition in an amount ranging from about 1 to about 30 wt. percent.

8. The aerosol composition according to claim 1, wherein the organic solvent is an alcohol.

9. The aerosol composition according to claim 8, wherein the alcohol is present in the composition in an amount ranging from about 1 to about 15 wt. percent.

10. The aerosol composition according to claim 1, wherein the neutralizing base is selected from the group consisting of amines and lithium bases.

11. The aerosol composition according to claim 10, wherein the neutralizing base is ammonia.

12. The aerosol composition according to claim 1, wherein the solids content of the composition ranges from about 30–40 wt. percent and the viscosity ranges from about 100 to 200 centipoises.

13. The aerosol composition according to claim 1, wherein the propellant is dimethyl ether which is present in the composition in an amount ranging from about 20 to 50 wt. percent.

14. The aerosol composition according to claim 13, wherein the monomer-modified alkyd resin is present in the composition in an amount ranging from 1 to less than 4 wt. percent.

15. The aerosol composition according to claim 14, wherein the water is present in the composition in an amount ranging from above 10 to less than 20 wt. percent.

16. The aerosol composition according to claim 15, wherein the solids content of the composition ranges from about 30–40 wt. percent and the viscosity ranges from about 100 to 200 centipoises.

17. The aerosol composition according to claim 1, the composition being non-flammable upon discharge from the container.

18. The aerosol composition according to claim 1, wherein the rosin-modified maleic resin has an acid value of greater than about 100.

19. A water-based aerosol coating composition suitable for discharge from an aerosol container comprising:
  1 to less than 5 wt. percent of an oil-modified alkyd resin which is rendered water-soluble by neutralization with a base,
  5 to 25 wt. percent of a rosin-modified maleic resin which is rendered water-soluble by neutralization with a base,
  1 to 15 wt. percent of an alcohol,
  10 to 50 wt. percent water,
  30 to 40 wt. percent dimethyl ether,
  0.05 to 2 wt. percent of an amine,
  0 to 15 wt. percent of a pigment,
  0 to 2 wt. percent of a dispersant,
  0 to 2 wt. percent of an aerosol container corrosion inhibitor, and
  0 to 15 wt. percent clay,
  said composition being non-flammable upon discharge from the container.

20. The aerosol composition according to claim 14, wherein the rosin-modified maleic resin is present in the composition in an amount of at least 5 weight percent.

21. A water-based aerosol coating composition suitable for discharge from an aerosol container comprising:
  from 1 to less than 5 wt. percent of an oil-modified alkyd resin which is rendered water-soluble by neutralization with a base,
  a rosin-modified maleic resin which is rendered water soluble by neutralization with a base,
  a water-soluble organic solvent,
  water, and
  a liquid propellant.

22. The aerosol composition according to claim 21, wherein the rosin-modified maleic resin is present in the composition in an amount ranging from at least 5 to about 25 wt. percent.

23. A water-based aerosol coating composition suitable for discharge from an aerosol container comprising:
  from 1 to less than 4 wt. percent of a monomer-modified alkyd resin which is rendered water-soluble by neutralization with a base,
  a rosin-modified maleic resin which is rendered water soluble by neutralization with a base,
  a water-soluble organic solvent,
  water, and
  from about 20 to 50 wt. percent of dimethyl ether as a liquid propellant.

24. The aerosol composition according to claim 23, wherein the rosin-modified maleic resin is present in the composition in an amount of at least 5 wt. percent.

25. The aerosol composition according to claim 23, wherein the water is present in the composition in an amount ranging from above 10 to less than 20 wt. percent.

26. The aerosol composition according to claim 25, wherein the solids content of the composition ranges from about 30 to 40 wt. percent and the viscosity ranges from about 100 to 200 centipoises.

* * * * *